United States Patent
Tseng

(10) Patent No.: US 8,612,111 B2
(45) Date of Patent: Dec. 17, 2013

(54) AUTOMATIC BRAKING SYSTEM INCLUDING LASER MODULE AND IMAGE CAPTURING MODULE AND VEHICLE HAVING SAME

(75) Inventor: Kuo-Fong Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/592,363

(22) Filed: Aug. 23, 2012

(65) Prior Publication Data

US 2013/0245905 A1 Sep. 19, 2013

(30) Foreign Application Priority Data

Mar. 15, 2012 (TW) .............................. 101108766 A

(51) Int. Cl.
*G01C 21/26* (2006.01)

(52) U.S. Cl.
USPC .......................................................... 701/70

(58) Field of Classification Search
USPC .......................................................... 701/70
See application file for complete search history.

(56) References Cited

U.S. PATENT DOCUMENTS

| | | | |
|---|---|---|---|
| 6,487,500 B2 * | 11/2002 | Lemelson et al. | 701/301 |
| 6,498,972 B1 * | 12/2002 | Rao et al. | 701/45 |
| 6,687,577 B2 * | 2/2004 | Strumolo | 701/1 |
| 6,906,639 B2 * | 6/2005 | Lemelson et al. | 340/903 |
| 6,950,014 B2 * | 9/2005 | Rao et al. | 340/438 |
| 7,143,856 B2 * | 12/2006 | Takahashi et al. | 180/274 |
| 7,630,806 B2 * | 12/2009 | Breed | 701/45 |
| 7,650,239 B2 * | 1/2010 | Samukawa et al. | 701/300 |
| 8,090,537 B2 * | 1/2012 | Nishira et al. | 701/301 |
| 8,447,474 B2 * | 5/2013 | Breed | 701/46 |
| 2008/0147253 A1 * | 6/2008 | Breed | 701/3 |

* cited by examiner

*Primary Examiner* — Thomas Tarcza
*Assistant Examiner* — Alex C Dunn
(74) *Attorney, Agent, or Firm* — Altis Law Group, Inc.

(57) ABSTRACT

An automatic braking system includes a laser module, an image capturing module, a braking module, and a control module. The laser module emits a laser beam along a forward direction of a vehicle and receives the reflected laser beam. The image capturing module captures a road image in front of the vehicle. The braking module slows the vehicle. The control module is electrically connected to the laser module, the image capturing module, and the braking module. When an intensity of the reflected laser beam is greater than a pre-set value, the image capturing module is controlled by the control module to captures the road image. When the control module decides that there are human characteristics in the road image, the control module activates the braking module.

8 Claims, 2 Drawing Sheets

AUTOMATIC BRAKING SYSTEM INCLUDING LASER MODULE AND IMAGE CAPTURING MODULE AND VEHICLE HAVING SAME

BACKGROUND

1. Technical Field

The present disclosure relates to braking systems and, particularly, to an automatic braking system and a vehicle employing the automatic braking system.

2. Description of Related Art

Braking systems are assembled in a vehicle to slow a speed of the vehicle by friction. The braking systems are manually activated by drivers according to road conditions. However, it is often that the drivers are too slow to operate the braking systems, resulting in accidents.

Therefore, it is desirable to provide a braking system for a vehicle, which can overcome the limitations described.

DETAILED DESCRIPTION

Embodiments of the disclosure will be described with reference to the drawings.

Figure 1:
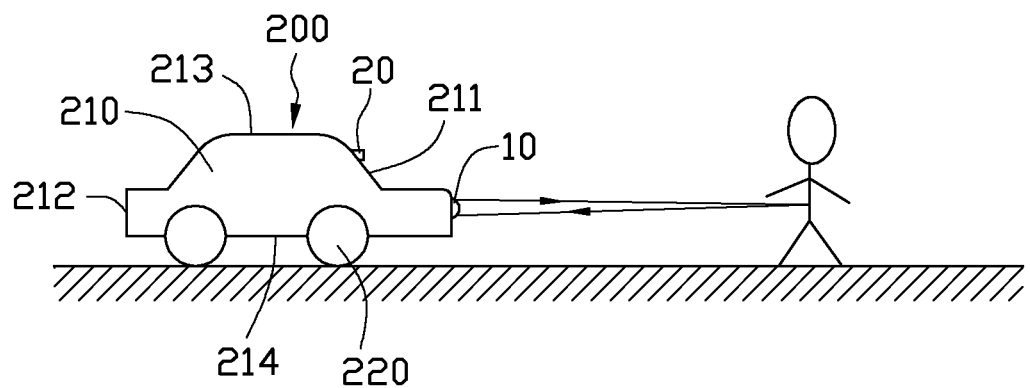
FIG. 1 is a schematic view of a vehicle in accordance with an exemplary embodiment.
Figure 2:
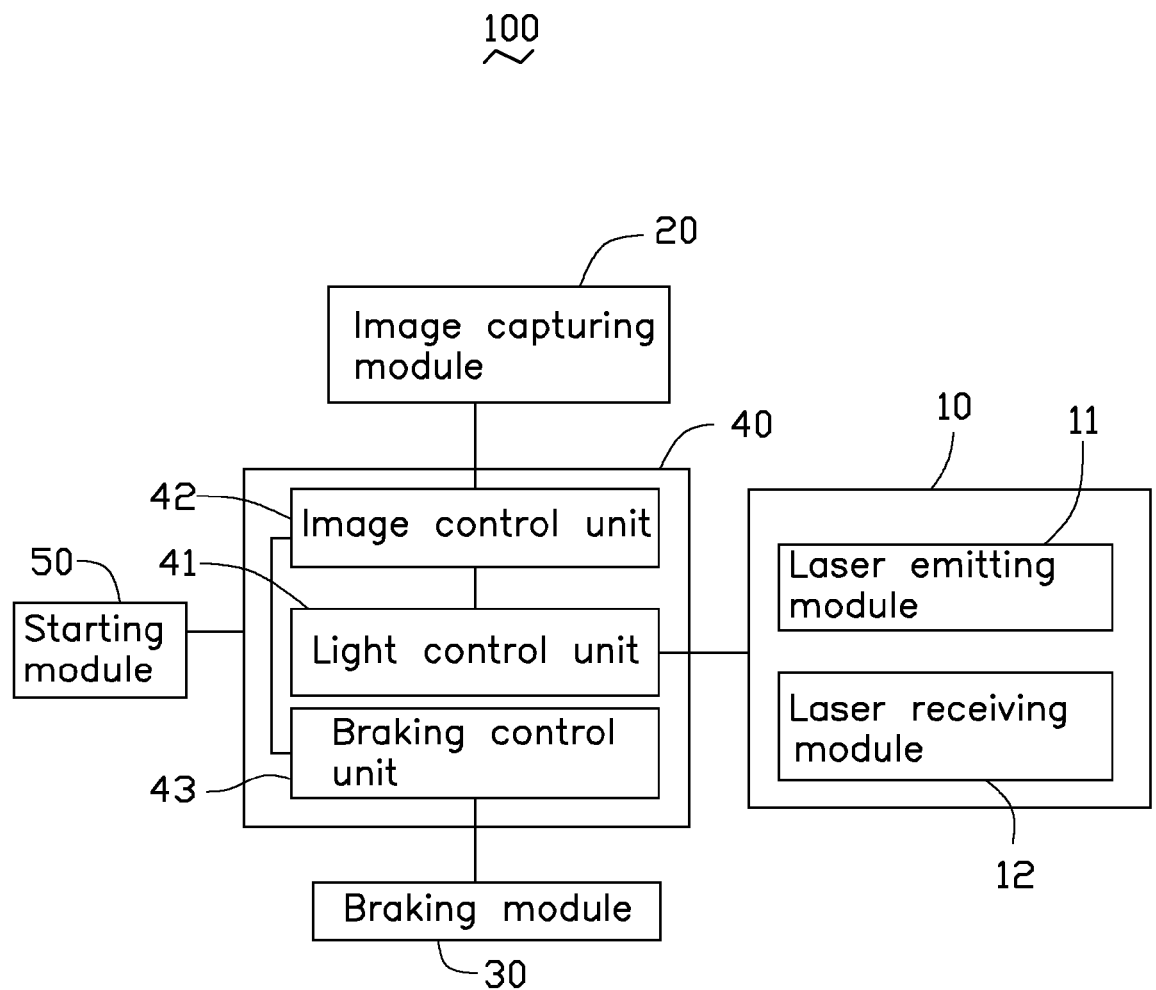
FIG. 2 is a functional block diagram of an automatic braking system of the vehicle of FIG. 1.

Referring to FIGS. 1-2, a vehicle 200, according to an exemplary embodiment is shown. The vehicle 200 includes a body 210, four wheels 220, and an automatic braking system 100. The four wheels 220 rotatably support the body 210. The automatic braking system 100 is installed on the body 210 and is configured for slowing a rotation speed of the wheels 220.

The body 210 includes a front end 211, a rear end 212 opposite to the front end 211, a top end 213, and a bottom end 214 opposite to the top end 213. The front end 211 faces a forward direction of the vehicle 200, and the bottom end 214 is adjacent to a road surface. The wheels 220 are assembled on the bottom end 214 of the body 210.

The automatic braking system 100 includes a laser module 10, an image capturing module 20, a braking module 30, a control module 40, and a starting module 50.

The laser module 10 is assembled on the front end 211 of the body 210, and aims in the forward direction of the vehicle 200. The laser module 10 includes a laser emitting module 11 and a laser receiving module 12. The laser emitting module 11 is configured for emitting a laser beam along the forward direction of the vehicle 200. The laser receiving module 11 is configured for receiving the laser beam reflected by a reflection element, such as a pedestrian. The laser beam emitted from the laser emitting modules 11 has a unique wavelength and frequency to avoid interference from the other vehicles 200. In this embodiment, in order to reduce influence of the different color of the reflection elements to the light intensity of the laser beam, the laser beam emitted from the laser emitting module 11 is color-mixture.

The image capturing module 20 is positioned on the top end 213 of the body 210, and aims at the forward direction of the vehicle 200. The image capturing module 20 is an infrared camera, and is configured for capturing a road image in the front of the vehicle 200. In order to reduce influence from outer environment, the image capturing module 20 can be received in the body 210.

The braking module 30 is positioned at the bottom end 214 of the body 210, and is configured for slowing the rotation speed of the wheels 220. The braking module 30 can be an oil brake or a gas brake. In this embodiment, in order to prevent the wheels 220 from locking up after the braking module 30 is activated, an anti lock brake system (ABS) is embedded in the braking module 30.

The control module 40 is received in the body 210, and is electrically connected to the laser module 10, the image capturing module 20, and the braking module 30. The control module 40 includes a light control unit 41, an image control unit 42, and a braking control unit 43. The image control unit 42 is connected between the light control unit 41 and the braking control unit 43.

The light control unit 41 is connected to the laser emitting module 11 and the laser receiving module 12 of the laser module 10. The light control unit 41 is configured for adjusting an intensity of the laser beam emitting from the laser emitting module 11, and comparing an intensity of the laser beam received by the laser receiving module 12 with a preset value.

The image control unit 42 is connected to the image capturing module 20. The image control unit 42 is configured for control the image capturing module 20 to capture the road image and analyze the road image, and decide whether or not there have any human characteristics in the road image, for example, a human face or human body.

The braking control unit 43 is connected to the braking module 30. The braking control unit 43 is configured for activating the braking module 30 when the image control unit 42 detects the human characteristics in the road image.

In this embodiment, when the light control module 41 decides that the intensity of the laser beam received by the laser receiving module 12 is greater than the preset value, the light control module 41 outputs a first control signal to the image control module 42. The image control module 42 controls the image capturing module 20 to capture the road image according to the first control signal. When the image control module 42 decides that there have any human characteristics in the road image, the image control module 42 outputs a second control signal to the braking control module 43. The braking control module 43 automatically activates the braking module 30 according to the second control signal. In this embodiment, a response time of the automatic braking system 100 is shorter than about 0.01 second.

When the light control module 41 decides that the intensity of the laser beam received by the laser receiving module 12 is lower than the preset value, the light control module 41 does not output any control signals. When the image control module 42 decides that there have no human characteristics in the road image, the image control module 42 does not output any control signals.

The starting module 50 is positioned at a driving table (not shown) of the vehicle 200, and is connected to the control module 40. When the starting module 50 is turned on by a driver, the automatic braking system 100 is activated. The driver of the vehicle 200 can choose whether or not to turn on the starting module 50 according to road conditions.

In use, when the vehicle 200 is driven in complex road conditions, the driver of the vehicle 200 activates the automatic braking system 100 by turning on the starting module 50. The light control module 41 controls the light emitting module 11 to emit the laser beam along the forward direction of the vehicle 200. When a pedestrian intrudes into a driving route of the vehicle 200, the laser beam emitting from the light emitting module 11 is reflected by the pedestrian and is received by the light receiving module 12. The light control module 41 compares the intensity of the laser beam received by the laser receiving module 12 with the preset value. When the intensity of the laser beam is greater than the preset value, the image control module 42 controls the image capturing module 20 to capture the road image in the front of the vehicle 200 in real time. When the image control module 42 decides that there are any human characteristics in the road image, the braking control module 43 automatically activates the braking module 30 to slow the wheels 220.

In order to prevent accidents from happening when the vehicle 200 is reversing, an additional image capturing module 20 is positioned at the rear end 212 of the body 210 to capture another road image from behind of the vehicle 200.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An automatic braking system for a vehicle, comprising:
    a laser module configured for emitting a laser beam along a forward direction of the vehicle and receiving the reflected laser beam;
    an image capturing module configured for capturing a road image in front of the vehicle;
    a braking module configured for slowing the vehicle; and
    a control module electrically connected to the laser module, the image capturing module, and the braking module;
    wherein when an intensity of the reflected laser beam is greater than a pre-set value, the image capturing module is controlled by the control module to capture the road image; when the control module decides that there are human characteristics in the road image, the control module activates the braking module.

2. The automatic braking system of claim 1, wherein the laser module comprises a laser emitting module and a laser receiving module, the laser emitting module is configured for emitting a laser beam along the forward direction of the vehicle, the laser receiving module is configured for receiving the reflected laser beam.

3. The automatic braking system of claim 2, wherein the control module comprises a light control module connected to the laser emitting module and the laser receiving module; the light control module is configured for adjusting intensity of the laser beam emitting from the laser emitting module and comparing the intensity of the reflected laser beam received by the laser receiving module with the pre-set value.

4. The automatic braking system of claim 1, wherein the control module comprises an image control module connected to the image capturing module, the image control module is configured for controlling the image capturing module to capture the rode image in the front of the vehicle and analyzing the road image to decide whether or not there are human characteristics in the road image.

5. The automatic braking system of claim 1, wherein the control module comprises a braking control module connected to the braking module, the braking control module is configured for activating the braking module.

6. The automatic braking system of claim 1, further comprising a starting module connected to the control module, wherein when the starting module is turn on, the automatic braking system is activated.

7. The automatic braking system of claim 1, wherein the image capturing module is an infrared camera.

8. A vehicle, comprising:
    a body;
    wheels rotatably assembled on the body; and
    an automatic braking system comprising:
        a laser module positioned on the body and configured for emitting a laser beam along a forward direction of the vehicle and receiving the reflected laser beam;
        an image capturing module positioned on the body and configured for capturing a road image in front of the vehicle;
        a braking module configured for slowing a rotation speed of the wheels; and
        a control module electrically connected to the laser module, the image capturing module, and the braking module;
        wherein when an intensity of the reflected laser beam is greater than a pre-set value, the image capturing module is controlled by the control module to capture the road image; when the control module decides that there are human characteristics in the road image, the control module activates the braking module.

* * * * *